United States Patent
Cunningham

(10) Patent No.: US 11,406,224 B2
(45) Date of Patent: Aug. 9, 2022

(54) KITCHEN APPLIANCE AND SYSTEM THEREFOR

(71) Applicant: KENWOOD LIMITED, Havant (GB)

(72) Inventor: Bradley Cunningham, Havant (GB)

(73) Assignee: KENWOOD LIMITED, Havant (GB)

(*) Notice: Subject to any disclaimer, the term of this patent is extended or adjusted under 35 U.S.C. 154(b) by 62 days.

(21) Appl. No.: 16/620,068

(22) PCT Filed: Jun. 4, 2018

(86) PCT No.: PCT/GB2018/051522
§ 371 (c)(1),
(2) Date: Dec. 6, 2019

(87) PCT Pub. No.: WO2018/224812
PCT Pub. Date: Dec. 13, 2018

(65) Prior Publication Data
US 2020/0093331 A1    Mar. 26, 2020

(30) Foreign Application Priority Data

Jun. 7, 2017 (GB) ...................... 1709092

(51) Int. Cl.
*G06F 3/16* (2006.01)
*A47J 43/08* (2006.01)

(52) U.S. Cl.
CPC ............ *A47J 43/087* (2013.01); *G06F 3/167* (2013.01)

(58) Field of Classification Search
CPC .......... A47J 43/087; A47J 43/04; A47J 43/07; G06F 3/167
See application file for complete search history.

(56) References Cited

U.S. PATENT DOCUMENTS

| | | | | |
|---|---|---|---|---|
| 5,844,343 A | * | 12/1998 | Horst | H02K 1/246 |
| | | | | 310/184 |
| 2004/0117274 A1 | | 6/2004 | Cenedese et al. | |
| 2007/0273311 A1 | * | 11/2007 | Guinet | A47J 43/08 |
| | | | | 318/245 |
| 2010/0104680 A1 | | 4/2010 | Lin et al. | |
| 2011/0137657 A1 | | 6/2011 | Cenedese et al. | |

(Continued)

FOREIGN PATENT DOCUMENTS

| | | |
|---|---|---|
| CN | 202035970 U | 11/2011 |
| CN | 102314871 A | 1/2012 |

(Continued)

OTHER PUBLICATIONS

International Search Report and Written Opinion issued in PCT/GB2018/051522, dated Sep. 10, 2018; ISA/EP.

(Continued)

*Primary Examiner* — Andrey Belousov
(74) *Attorney, Agent, or Firm* — Harness, Dickey & Pierce, P.L.C.

(57) ABSTRACT

A kitchen appliance has a control arrangement arranged to receive sound commands and to operate the appliance in response to the sound commands; a microphone arranged to receive sound comprising a sound command and to provide the sound to the control arrangement; and at least one acoustic filter configured to suppress from the sound provided to the control arrangement background noise created by operation of the kitchen appliance.

8 Claims, 6 Drawing Sheets

(56) References Cited

U.S. PATENT DOCUMENTS

| | | |
|---|---|---|
| 2012/0232903 A1 | 9/2012 | Cenedese et al. |
| 2013/0027862 A1* | 1/2013 | Rayner .................. H01H 13/06 361/679.3 |
| 2014/0345474 A1 | 11/2014 | Trench Rocha et al. |
| 2015/0032456 A1* | 1/2015 | Wait ........................ G10L 15/26 704/275 |
| 2015/0095790 A1* | 4/2015 | Yoshida ................ G06F 3/0482 715/740 |
| 2015/0254053 A1* | 9/2015 | Gardner .................. H03G 3/04 700/83 |
| 2015/0279370 A1 | 10/2015 | Koetz |
| 2015/0305567 A1 | 10/2015 | Koetz |
| 2016/0169576 A1* | 6/2016 | Takaki ................... F25D 23/12 700/275 |
| 2017/0084275 A1 | 3/2017 | Koetz |
| 2018/0196395 A1* | 7/2018 | Salmon .................. G04G 9/007 |
| 2018/0338512 A1 | 11/2018 | Palmer et al. |

FOREIGN PATENT DOCUMENTS

| | | |
|---|---|---|
| CN | 105874405 A | 8/2016 |
| CN | 105902139 A | 8/2016 |
| GB | 2525398 A | 10/2015 |
| WO | WO-02068886 A1 | 9/2002 |
| WO | WO-2015088141 A1 | 6/2015 |
| WO | WO-2017151357 A1 | 9/2017 |

OTHER PUBLICATIONS

GB Search Report of the Intellectual Property Office issued in Application No. GB1709092.9, claims 1-18 and claim 33, dated Nov. 13, 2017.

GB Search Report of the Intellectual Property Office issued in Application No. GB1709092.9, claims 23-32, 19-22, and 24-32, dated Apr. 25, 2018.

Chinese Office Action for Application No. 201880031626.5 (with English translation) dated Dec. 21, 2021 (11 pages).

* cited by examiner

KITCHEN APPLIANCE AND SYSTEM THEREFOR

CROSS-REFERENCE TO RELATED APPLICATIONS

This application is a 371 U.S. National Stage of International Application No. PCT/GB2018/051522, filed Jun. 4, 2018, which claims the benefit of Great Britain Application No. GB1709092.9, filed on Jun. 7, 2017. The disclosure of each of the above-identified applications is incorporated herein by reference.

The present invention relates to a kitchen appliance, such as an appliance for processing food or a beverage making appliance, and for control by means of sound commands, in particular to so-called "artificially intelligent" kitchen appliances. The present invention also relates to a system for controlling a kitchen appliance.

Current kitchen appliances are often unhygienic, as a user is required manually to push buttons/screens or turn rotary switches to control the machine. In food preparation this can lead to food contamination. For example, the user may have put raw chicken in their cooking kitchen machine and turned the machine on. A few hours later they may forget that they have done this, and again turn the machine on. This can result in a spread of bacteria, which is capable of causing the user (or other users) to become ill.

Furthermore, current kitchen appliances have fixed outcomes. All current machines behave in the same way regardless of, for example, the context, country or culture they are being used in. For example, the eating habits of someone living in France compared to someone living in South America can vary significantly, therefore a smart appliance which can recognise the individual and learn to suggest the recipes that fit their diet is unique.

According to the invention, there is provided a kitchen appliance such as a food processing appliance having a control arrangement arranged to receive sound commands and to operate the appliance in response to the sound commands, a microphone arranged to receive sound comprising a sound command and to provide the sound to the control arrangement; and at least one acoustic filter configured to suppress from the sound provided to the control arrangement background noise created by operation of the food processing appliance.

Thus the invention may enable or enhance the ability of a food processing appliance to be operated by sound commands such as voice control, even when the appliance is operating.

"Background noise" may herein be used to connote any sound other than the sound command, in particular sound that is disruptive to the detection of the sound command.

The acoustic filter may be further configured to suppress background noise from any other source. "Sound command" may herein be used to connote any sound that conveys a predetermined meaning, such as information, a question or an instruction. Preferably, the term "sound command" encompasses, at least a voice command.

Preferably the acoustic filter is arranged to suppress noise created by movement of moving parts of the food processing appliance. For example, the food processing appliance may comprises a motor for driving a food processing tool, and the acoustic filter may be arranged to suppress noise created by operation of the motor.

Preferably the motor is one selected from the group comprising brushless motors and reluctance motors as these are quiet, accurately controllable, and do not generate brush-dust. More preferably the motor is one of a switched or a synchronous reluctance motor.

Preferably, the food processing appliance comprises a sensor for sensing at least one of: speed; torque; current; rotor-position; and direction of the motor, and the acoustic filter may be configured to vary the suppression of background noise in dependence on the sensor output. The acoustic filter may be adapted to vary any of the magnitude and frequency range of the suppression. Moreover the microphone may be sensitive to sound between 20 Hz to 20 kHz, more preferably sound between 200 Hz to 4 kHz, and still more preferably to sound between 400 Hz and 2.5 kHz.

The sensor may be one selected from the group comprising optical encoders, magnetic encoders, hall-effect sensors, and sensors detecting characteristics of electrical current flowing through the motor with processing means for calculating speed and/or torque of the motor based on the detected characteristic.

The acoustic filter may be configured to suppress background noise before and/or after a sound is detected by the microphone, and may comprise an active and/or passive noise cancellation system. The acoustic filter may comprise: an analogue signal filter, a digital signal filter, a high pass filter, a bandpass filter, and/or a pop screen.

Preferably, the food processing appliance comprises a processor arranged to identify an operating instruction from a sound command. For example, the instruction may be a command to: operate and/or adapt functionality of the food processing appliance and/or of any peripheral device with which it is in communication; operate the food processing appliance, including activate/deactivate a predetermined program for the food processing appliance and change operation of the food processing appliance (including, for example, processing temperature, time and/or speed); and/or save, retrieve, communicate and/or output information (including a recommendation).

Preferably, the microphone comprises a liquid-tight cover, and the acoustic filter may comprise the cover.

The food processing appliance may be a stand mixer, blender, food processor, juicer or mincer.

The invention also provides a system for controlling a food processing appliance that is operable by means of sound commands, the system comprising: a microphone; a processor for processing sound from the microphone so as to identify an instruction from the sound command; and a food processing appliance comprising a controller configured to receive the instruction from the processor and to control the food processing appliance in dependence on the instruction, wherein at least one of the microphone and the processor is arranged as part of a device other than the food processing appliance, for example a mobile communication device or a smart speaker.

Preferably the device other than the food processing appliance is in wireless communication with the microphone and/or food processing appliance, and more preferably by means of BlueTooth® and/or WiFi. Preferably, the microphone and the processor are both in the food processing appliance or are both in the same device other than the food processing appliance. Preferably, the microphone is in a handheld mobile communication device and the processor is part of a cloud computing network.

Optionally the system further comprises a distance and/or orientation sensor for determining the distance and/or orientation of a sound-source relative to the microphone, and may also comprise an acoustic filter configured to vary suppression of sound from a source in dependence on the distance and/or orientation of the sound-source detected by the distance and/or orientation sensor. In this way noise sources coming from a specific distance, orientation and/or direction can be suppressed, or alternatively all sound not coming from a given source (e.g., the user) may be suppressed.

Preferably the system further comprises a memory in which the detected distance and/or orientation of a sound-source can be stored. This avoids the need for repeated processing. More preferably still where sound is not detected from that sound source for a predetermined amount of time, say 24 hours, the data is deleted to free up memory.

The food processing appliance may comprise a transceiver, preferably for wireless communication with the processor and/or microphone. The processor is preferably configured to identify a quality relating to the sound command, and to determine the instruction from the quality that is identified.

The quality may be a meaning, sentiment or mood that is associated with the way in which a sound is expressed, for example its speed, pitch, cadence and volume, as well as any emphasis and intonation (and the variation of any of these exemplary aspects).

The invention also provides a system for controlling a kitchen appliance such as a food processing appliance that is operable by means of sound commands, the system comprising: a microphone; a processor for processing sound from the microphone so as to identify from the sound a sound command and a quality relating to the sound command, and to provide an instruction in dependence upon the command and the quality; and a food processing appliance comprising a controller configured to receive the instruction from the processor and to control the food processing appliance in dependence on the instruction.

The processor may be configured for speech recognition, for example comprising an API for speech recognition. The processor may covert sound commands into text, and may convert text derived from the sound command into the instruction.

The sound command may be in the form of a voice command from a user, and the quality may be the identity of the user, and the controller may be arranged to control the food processing appliance in dependence on the identified user.

Preferably the system comprises a database for storing data relating to identified users and/or relating to various food processing appliances which may be controlled by the system, wherein the processor is configured to retrieve, from the database, data relating to a given user or appliance once the user or appliance has been identified. Preferably, the data stored in the database comprises user preferences include, including at least one of: user interface settings and food preferences and patterns. Preferably, the food processing appliance and/or the processor are/is in communication with the database so as to retrieve and store user preferences from and to the database.

In one example, the controller is configured to control the food processing appliance in dependence on at least one of: time of day; ambient light levels; and weather.

Preferably the controller is configured to control the food processing appliance so as to output information, preferably the information relating to a proposed food processing operation, such as a recommendation for a recipe or an ingredient.

The processor may be configured to identify an instruction based on machine learning, preferably the instruction being the output of information relating to a proposed operation. Preferably, the machine learning is trained from previous actions by a given user or a group of users. Previous actions are stored on the database.

Preferably, the group of users are a plurality of users other than a given user, and more preferably the group of users is a subset of all users wherein the subset comprises similar characteristics to a given user. The characteristics may include any of: age; location; sex; physical characteristics; family membership, position, or status; desired diet; culture; ethnicity; marital status; occupation; personality; culinary preferences; and allergies.

The microphone is optionally activated by a device other than the food processing appliance, such as a proximity sensor; a camera; a microphone; and/or a button. The microphone may be activated at a scheduled time, or may be constantly activated.

Preferably, the food processing appliance comprises a wireless transceiver for communicating with the processor and/or microphone.

The system may comprise a food processing appliance as defined above.

The invention also provides a food processing appliance for processing food comprising: a microphone, wherein the food processing appliance is controlled in dependence on signals received by the microphone; and a liquid-tight cover at least partially shielding the microphone from food. Thus the microphone may be protected from spillage.

Preferably, the cover is formed from a low-friction, hydrophobic and/or oleophobic material, and may be shaped to allow food to slide off of the cover, for example with steep faces or orientated to allow food to slide off of the cover, for example with downwardly-orientated face.

Preferably, the microphone is provided proximate to where food is processed in the food processing appliance, and more preferably within 15 cm, and still more preferably within 10 cm or 5 cm.

The invention also encompasses a kit of parts for constructing any of the apparatuses or apparatus elements herein described.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints;

building materials; clothing materials; agricultural and/or veterinary feeds and/or treatments, including fertilizers, grain and other agricultural and/or veterinary products; oils; fuels; dyes; cosmetics; plastics; tars; finishes; waxes; varnishes; beverages; medical and/or biological research materials; solders; alloys; effluent; and/or other substances, and any reference to "food" herein may be replaced by such working mediums. It will be appreciated that the processing of food may include the processing and/or blending of liquid, and may also include the processing of solid food or ice into a liquid form.

Whilst the invention has been described in terms of a kitchen appliance, any device from the fields in the preceding paragraph may also profitably incorporate the invention described herein. Any voice-control or speech-reception/transmission mechanism associated with an electrically-powered vehicle or electrically-powered machinery may profitably incorporate the noise-cancellation dependent on motor-speed/characteristics, or any other advantageous feature described herein. However, this invention is considered particularly advantageous in the kitchen field for the reasons described herein.

The invention described here may be used in any kitchen appliance and/or as a stand-alone device. This includes any domestic food-processing and/or preparation machine, including both top-driven machines (e.g. stand-mixers) and bottom-driven machines (e.g. blenders). It may be implemented in heated and/or cooled machines. It may be used in a machine that is built-in to a work-top or work surface, or in a stand-alone device. The invention can also be provided as a stand-alone device, whether motor-driven or manually powered.

The invention described herein may also be applied to beverage-making machines. For example, fully-automatic coffee machines (e.g. due to the noise generated by their grinders), kettles (e.g. due to the sound emitted whilst boiling), drip coffee machines (e.g. due to the sound created by the steam-bubbles used to drive water) can all profit from enhanced noise cancellation. The term "kitchen appliance" should be interpreted as including beverage-makers as well as food processing appliances.

Embodiments will now be described, by way of example only and with reference to the accompanying drawings having like-reference numerals, in which.

SPECIFIC DESCRIPTION

Figure 1A:
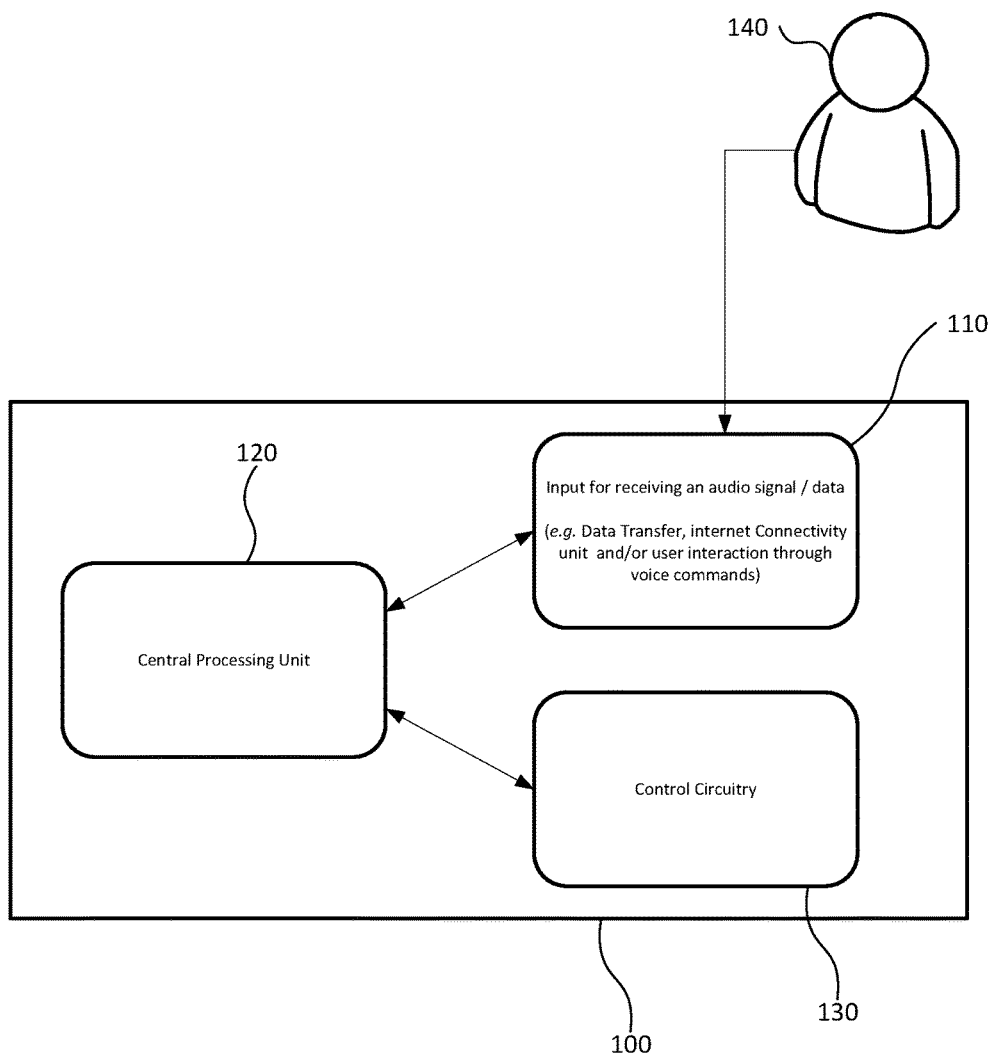
FIG. 1 show schematic diagrams of systems for controlling a kitchen appliance for processing food by means of a voice command.

FIG. 1a illustrates a system for controlling a kitchen appliance 100 for processing food (i.e. a food processing appliance) by means of a voice command. The kitchen appliance is, for example, a stand mixer, blender, grinder, juicer, or the like.

The kitchen appliance 100 comprises: an input for receiving an audio signal 110; a control arrangement (or processor, such as a central processing unit) for processing an input audio signal 120; and a controller 130 for controlling the kitchen appliance in dependence on (the input audio signal that is processed by) the processor. The audio signal may be associated with a voice command from a user 140.

In one example, the input 110 is a microphone. The microphone is triggered to start input of sound for recognition by the processor 120. Input sound is then sent to an Application Programming Interface (API) for recognition and speech-to-text analysis by the processor 120, and an ASCII string of the input sound is output. The ASCII string is then processed, by the processor, using natural language processing, which for example identifies keywords from the string such as "actions" (e.g. programs, length of time, etc.). The actions from the string are then interpreted as instructions that are used to control the kitchen appliance, to provide feedback or to suggest recipes and/or functions.

For example, the microphone 110 records the sound input "prepare a cake mix", which is forwarded to the processor 120. The processor, by means of speech recognition, identifies the intention of the voice command and associates this with an appropriate instruction (e.g. from a library of commands), for example to activate (by means of the control circuitry 130) a mixing programme for cake mixture, which defines the type of tool to be used, mixing times and/or speeds. In addition, the processor instructs the controller to communicate to the user at least one recipe for a cake.

Alternatively, the input 110 is an audio input jack (e.g. for receiving an audio signal from an external device).

The library of commands used may be a library selected from a group of libraries based on meta-data sent with the forwarded sound-input indicating that the input is associated with a specific user, group of users, appliance, or group of appliances. This library may be a pre-constructed one, or one built up through repeated user interactions using e.g., machine learning, or a mixture of the two.

The microphone 110 is preferably provided proximate to where food is processed in the food processing appliance 100, and more preferably within 15 cm, and still more preferably within 10 cm or 5 cm. This ensures that the user may speak directly to it, and it is close enough to pick up the user's voice with relative clarity.

Figure 1B:
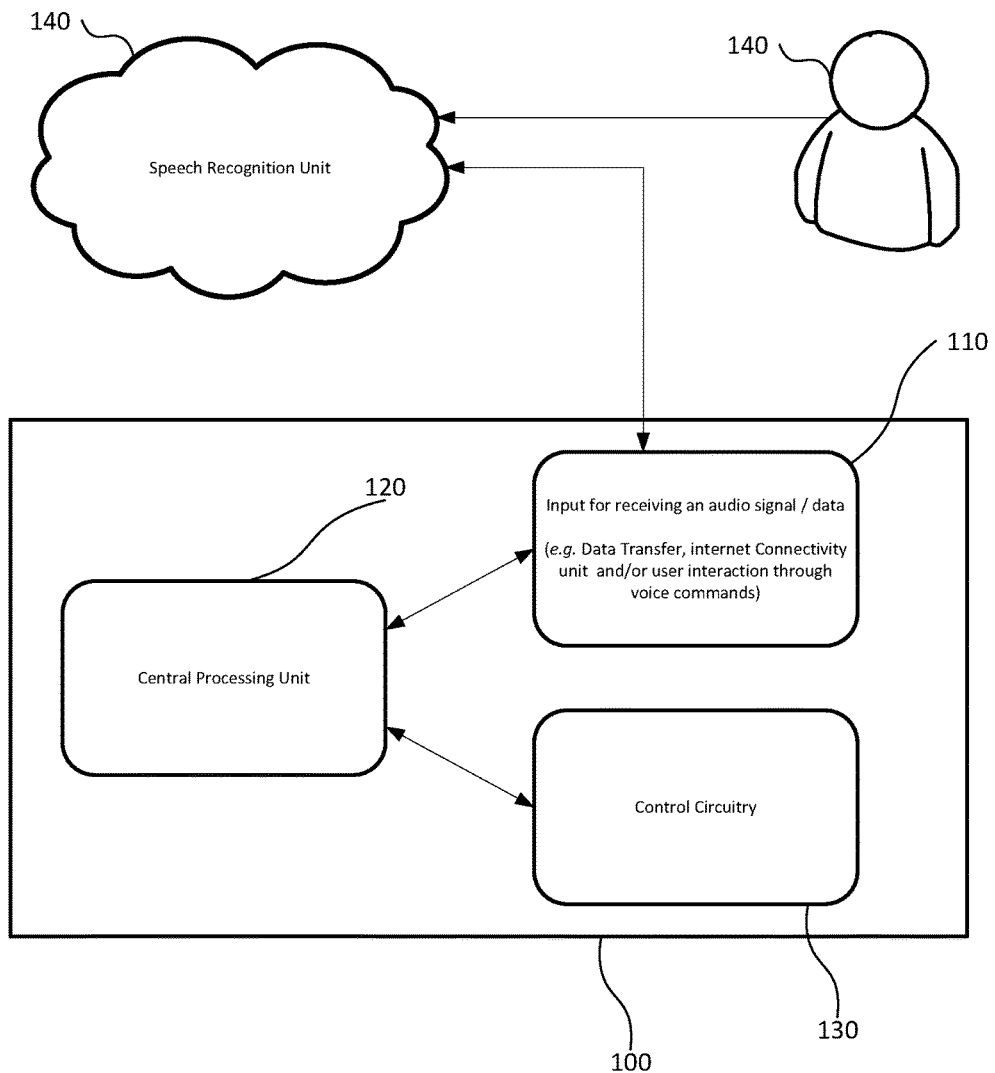

In an alternative example shown in FIG. 1b, the input 110 is a data transfer and/or internet connectivity unit (e.g. BlueTooth® or Wi-Fi unit) that is capable of receiving data (such as a command and/or a recipe) directly from a speech recognition unit 140.

The speech recognition unit 140 is a peripheral communication device (not shown) that is capable of receiving sound and speech recognition (either by itself or via communication with a networked entity, such as within a cloud network). The speech recognition unit 140 comprises, either as part of the peripheral communication device or as part of the networked entity, a database comprising: recipes; food recommendations; user identifiers (including voice identifiers); a library or libraries of instructions for use with appliances which may be downloaded from a server via the internet when the speech recognition unit 140 is connected to the appliance 100, or the speech recognition unit 140 may directly query the library or libraries on the server when receiving instructions; and/or user preferences.

The input 110 (and thus kitchen appliance 100) and the speech recognition unit 140 are configured to communicate bi-directionally. In this way, the speech recognition unit 140 can receive diagnostic information regarding the kitchen appliance and/or users' details (including users' identities and preferences). Feedback may thus be provided to the user from the appliance 100 either directly from an interface of the appliance 100 or via the speech recognition unit 140.

In order to operate the kitchen appliance 100 by means of a voice command, the user provides a voice command to the speech recognition unit 140 (e.g. directly to the peripheral communication device), which processes (either locally or distantly at the networked entity) the voice command as outlined in relation to FIG. 1a.

A command is received by the input 110, which is forwarded to the Central Processing Unit 120 and control circuitry 130 in order to affect the operation of the kitchen appliance and/or to communicate to the user a recipe or recommendation.

In one example, the speech recognition unit 140 comprises a peripheral communication device in the form of a mobile phone, a tablet or a personal computer. However the speech recognition unit 140 may be any device in electronic communication (wired or wireless, direct or mediated through one or more intermediaries) with the kitchen appliance 100. For example, the speech recognition unit 140 may be a stand-alone microphone assembly (optionally including a speaker for providing auditory feedback to the user) such as an Amazon Echo™ or Google Home™ smart-speaker or other such smart-speaker. Spoken instructions for the appliance 100 may be enabled on the smart-speaker through activation on a cloud-based online profile by, e.g., purchasing a software application on the cloud-based service on which the profile resides.

Figure 1C:
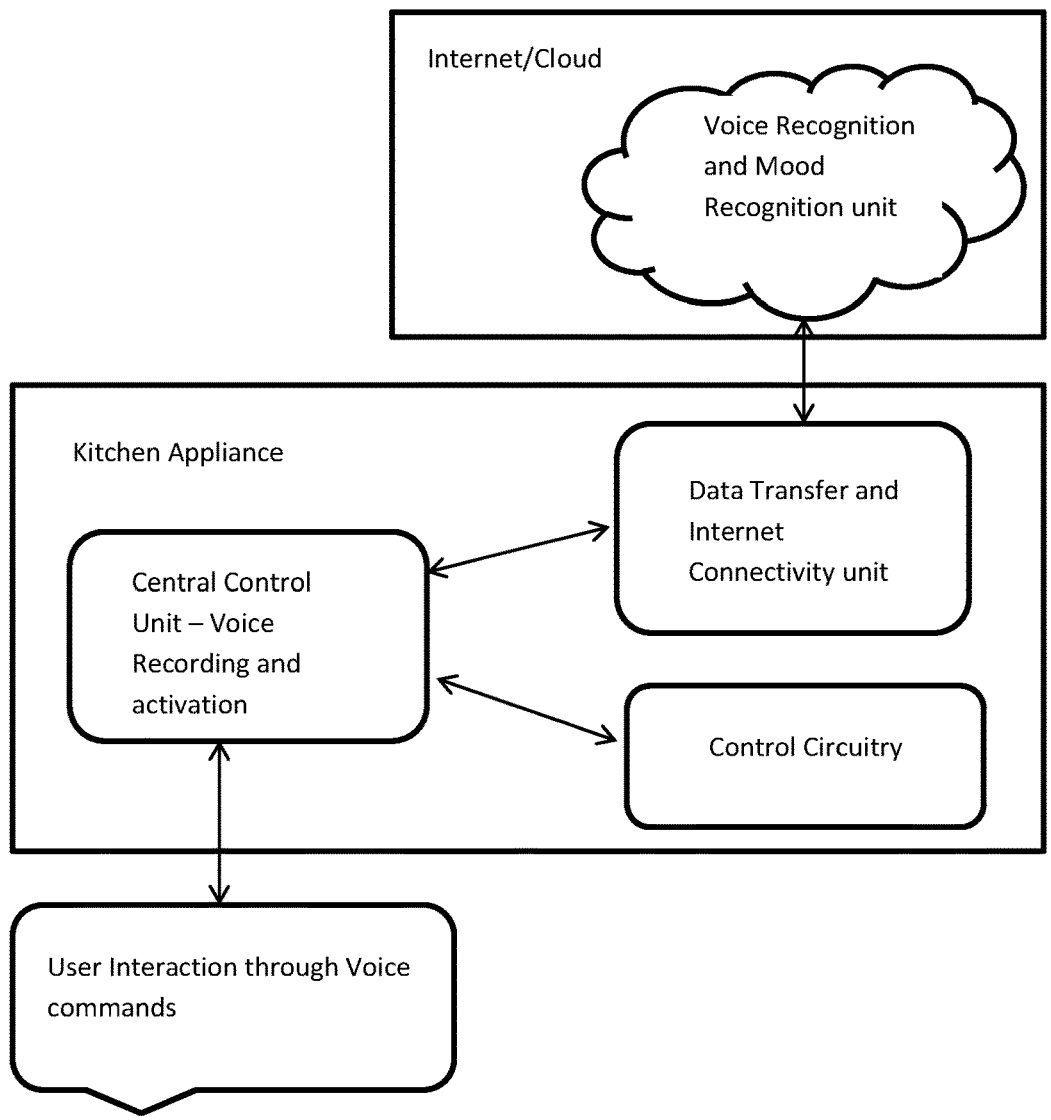

FIG. 1c is yet another example of a system for controlling a kitchen appliance 100 for processing food by means of a voice command.

Figure 2:
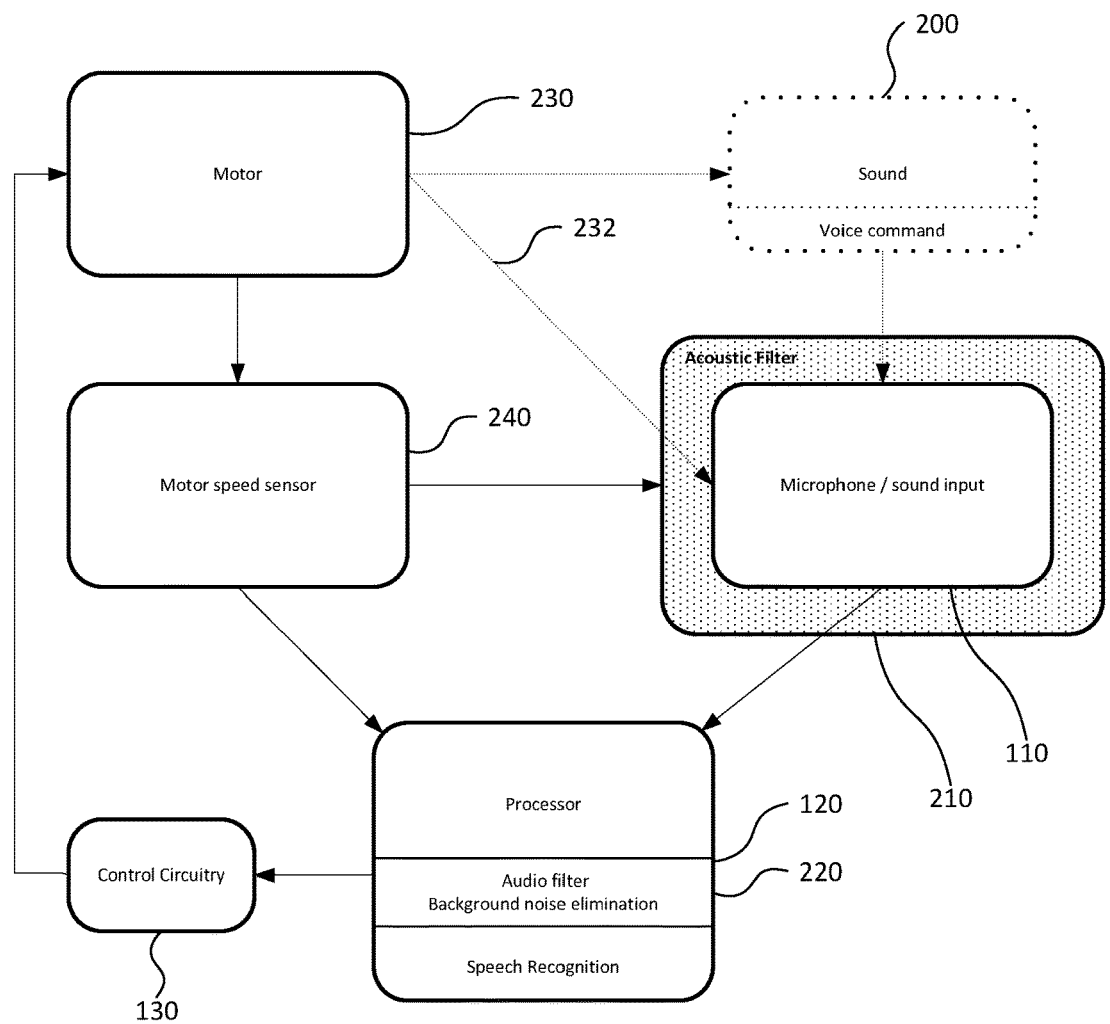
FIG. 2 is a schematic diagram of an acoustic filter system in a kitchen appliance for processing food by means of a voice command.

FIG. 2 shows the use of an acoustic filter to improve sound input so as to control a kitchen appliance.

When the input 110 is in the form of a microphone (or sound input more generally) incorporated in the kitchen appliance 100, in order for the microphone accurately to detect sound, without distortion or disruption, the kitchen appliance 100 comprises an acoustic filter configured to suppress background noise. A contributor to background noise might include the noise of the motor and/or other moving parts of the kitchen appliance, such as the contact of a tool of the kitchen appliance with food and with a bowl of the kitchen appliance.

A sound 200, which includes a voice command, is input into the kitchen appliance via the microphone 110. In one example, the microphone comprises an acoustic filter 210. For example, the acoustic filter utilises passive noise cancellation (such as sound insulation, vibration isolation, a pop screen and/or a windscreen) and/or active noise cancellation.

The active noise cancellation operates by sensing (e.g. by means of a second microphone, not shown) sound from a noise source (such as noise 232 from the motor 230), either by emitting (for example by means of a speaker, not shown) sound that destructively interferes with the detected noise or by other means for cancelling noise from sound received by any of the microphones.

In addition or alternatively, the processor 120 of the kitchen appliance, which receives an audio input from the microphone 110, also comprises (or is in communication with) an acoustic filter 220. The acoustic filter 220 is in the form of an analogue or digital filter, such as a low-pass or bandpass filter.

When the motor 230 of the kitchen appliance is running, the acoustic filter(s) (210 and/or 220) is used (once activated, where appropriate) so as to eliminate some, if not all, background noise (i.e. that which does not form part of the voice command) prior to processing of the audio input by the processor 120 (sand/or the speech recognition unit 140).

The kitchen appliance further comprises a motor sensor 240 for sensing the speed, torque, rotor-position, or other characteristic of the motor, from which frequency, pitch, intensity, and amplitude of sound emitted by the motor is predicted in order to aid the acoustic filters (210 and/or 220) to reduce noise by adapting the operation of the filter(s), for example by removing noise for the switching components that control the speed of the motor.

The motor 230 may be a brushless motor for reducing noise caused by brushes sweeping across electrical contacts within the motor 230, as well as reducing the creation of brush-dust that may contaminate food. In one example, the motor 230 may be a reluctance motor such as a synchronous or switched reluctance motor, which allow accurate control of motor characteristics like rotor-position (i.e., the angular position of a given point on the rotor relative to its central axis). The motor sensor 240 may be an optical encoder, magnetic encoder, hall-effect sensor detecting a magnetic encoder, or may consist of a sensor detecting characteristics of electrical current flowing through the motor and suitable processing means for calculating speed/torque/position of the motor based on the feedback of this sensor.

The microphone(s) 110 that is (/are) incorporated within the kitchen appliance may be exposed to food, including liquids and small particles. As a result, in order to improve longevity of microphone, the microphone is provided with a cover (not shown) that is configured to shield the microphone from food.

Where the microphone 110 is located outside the kitchen appliance 100 (e.g., in a phone, tablet, or other mobile device), it may include or communicate with a location sensor for determining its location, distance, and/or orientation relative to the appliance 100 and/or its motor 230. Feedback from this sensor may then be used to determine an appropriate level or characteristic of noise-cancellation, for example by cancelling sound arriving at the microphone corresponding to sound emanating from the distance and/or orientation of the appliance 100.

The location sensor may be a simple range-determining sensor using electro-magnetic transmissions (including light, infra-red, and radio-frequency) from one of the microphone 110 and appliance 100 to the other of the microphone 110 and appliance 100. Alternatively the location sensor may comprise global positioning system (GPS) terminal(s), or indoor positioning system (IPS) modules using visual, inertial or other data to determine the position (either in absolute terms, or relative) of both the microphone 110 and the appliance 100 and thus their relative distance. Orientation of the microphone 110 may be determined by sensing using either a magnetic compass and/or a gravitational sensor, or by other known means.

One draw-back of determining distance only is that this does not account for the acoustic path between the microphone 110 and the appliance 100 being potentially longer than the absolute distance due to, for example, sound bouncing around a corner. One possible way of compensating for this is to use known details of the location in which the microphone is situated to compensate for this (e.g., a house-plan downloaded from a suitable database, or information collected via a visual sensor and proceed using image-recognition software) by determining the acoustic path. Another way is to use an array of microphones, such as a far-field array (FFA) to triangulate the orientation and distance of the appliance (or at least the orientation of sound from the appliance arriving at the FFA and its acoustic path-length) relative to the microphone 110.

In an alternative or additional implementation, the distance (either direct or acoustic) and/or orientation of the user is determined using similar techniques to those above, and all other sound (i.e., from sources at differing distances) is suppressed/cancelled.

Preferably the location/distance sensor is associated with a memory in which the location and/or distance of a sound-source can be stored. Each sound source may be identified with a relatively easy-to-determine identifier (e.g., the frequency emitted). In this way repeated processing to identify the distance, location, and/or orientation of a sound-source for cancellation purposes may be avoided. Where noise has not been detected from the stored sound-source for a pre-determined time-period (e.g., 24 hours) it may be deleted from the memory.

For example, the cover is a waterproof enclosure, such as a rubber boot. The cover is shaped to allow food to slide off of the cover. The boot is also orientated to allow food to slide off, such that liquids/food that may spill down the machine do not fall and block the microphone. The cover is preferably formed from, or coated with, a low-friction, hydrophobic and/or oleophobic material (such as PTFE) to prevent material sticking to it and to repel watery/oily food materials.

Figure 3:
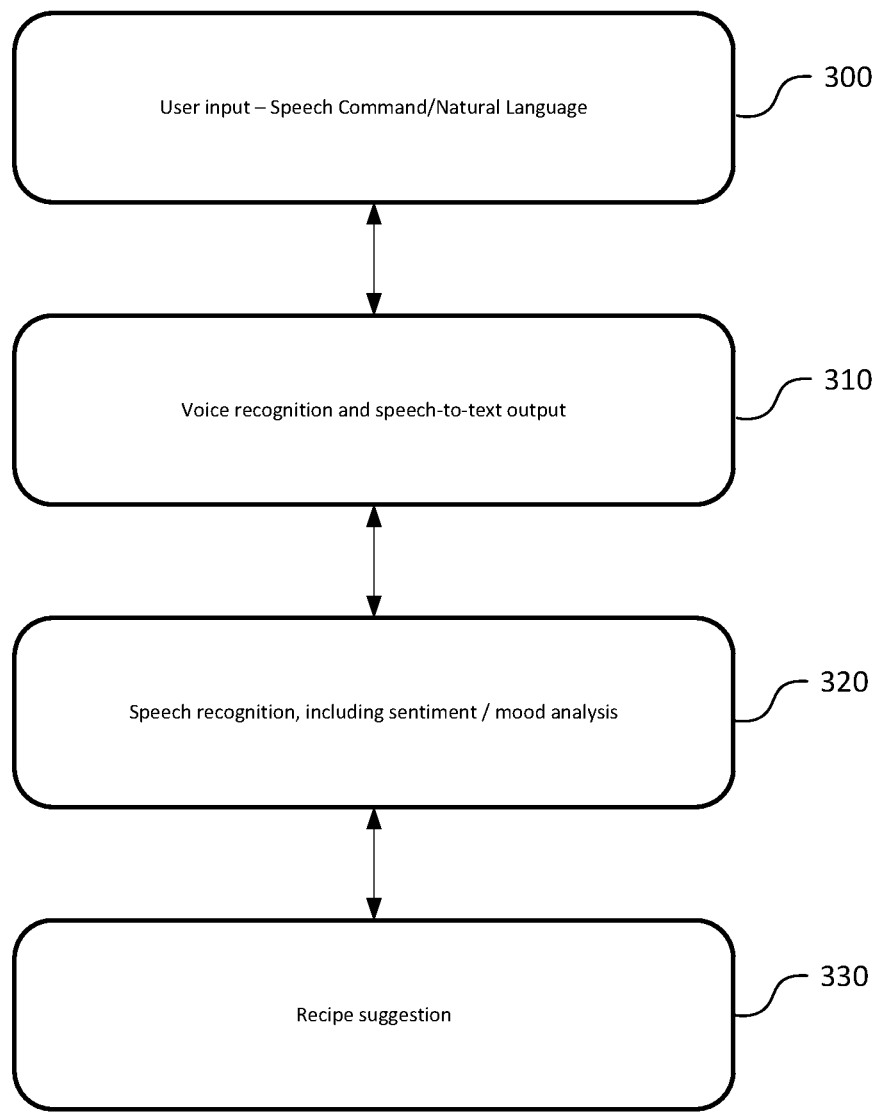
FIG. 3 is a flow diagram of a process of controlling a kitchen appliance for processing food by means of a voice command.

In order better to interpret voice command, the kitchen appliance is configured to interpret a quality relating to the sound command, such as a "mood" (i.e. "mood recognition") of a voice command; this process is outlined in the flow diagram in FIG. 3. As used herein, the term "speech recognition", preferably, also encompasses "mood recognition".

Sound 200 is received 300 and processed 310 as outlined above with reference to FIGS. 1 and/or 2.

At a next step 320, once the sound has been processed, the processor 120 or speech recognition unit 140 (which further comprises a "mood analyser") analyses, for example, the pitch, inflection and/or spectral content of the audio signal to determine the mood of the input audio signal, and therefore that of the user.

If a mood of the audio signal is determined (e.g. by means of artificial intelligence and/or a predefined library), operation of the kitchen appliance is adjusted at a next step based on the determined mood. For example, the kitchen appliance recommends a recipe based on mood 330.

The kitchen appliance therefore utilises mood analysis to become an intelligent coach. For example, identifiable moods, and corresponding recipe suggestions, might include recipes comprising:
  chocolate and/or sugar for users that sound upset (e.g. chocolate mousse);
  caffeine and/or food high in carbohydrates for users who sound tired; and
  surprise and/or novelty ingredients/recipes for users that sound excited; and
  healthy ingredients/"superfoods" for users that sound ill (e.g. congested).

By means of machine learning, the kitchen appliance (and/or the speech recognition unit 140) learns to understand the user based on the recipes that they cook, with a consideration of, for example: the time of day; mood analysis; what nutrients a user is lacking (or has in excess); and ingredients that they have available; and/or ingredients they enjoy or dislike. This will allow the user to develop a unique recipe coach and suggestion engine.

Figure 4:
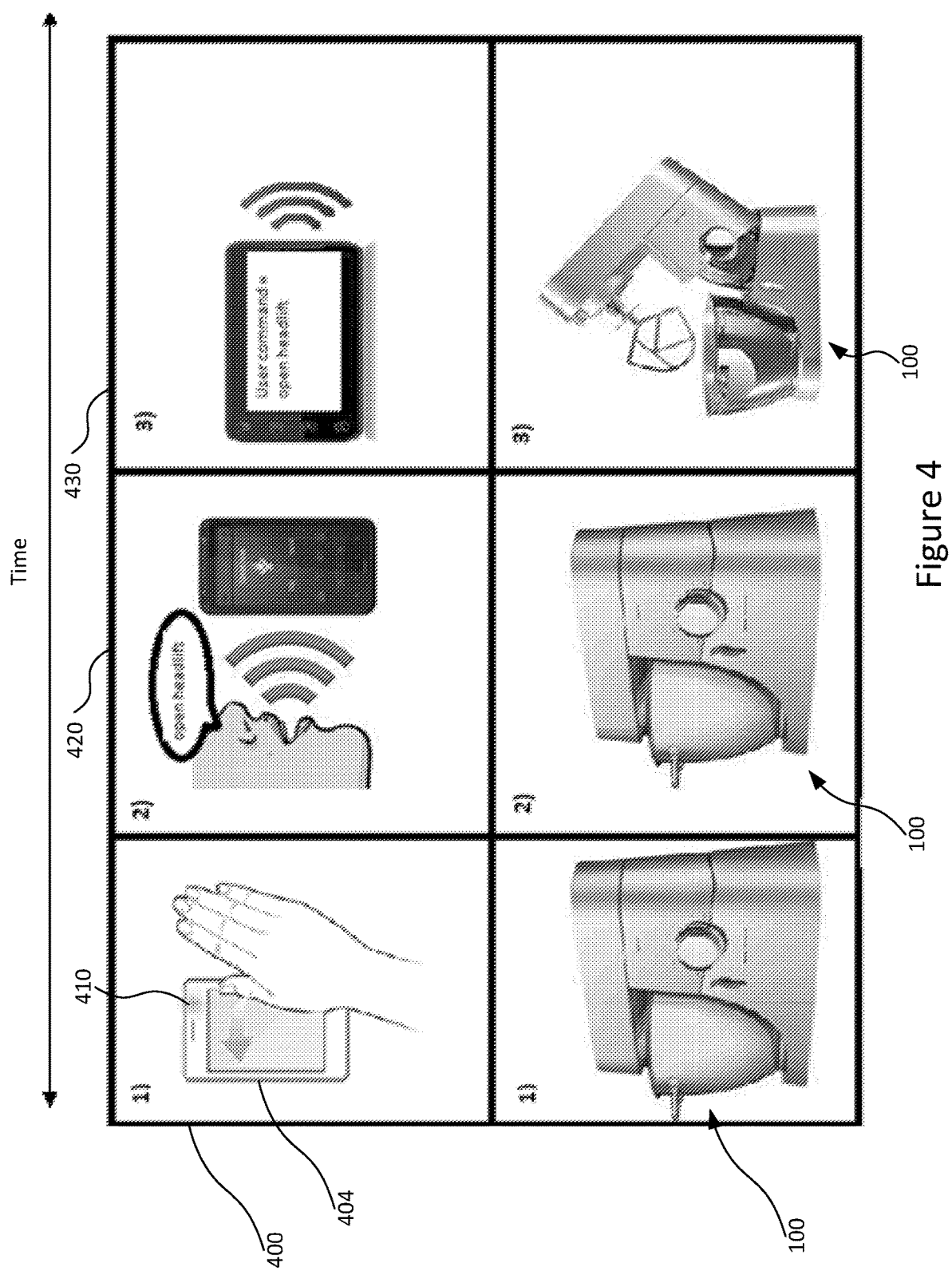
FIG. 4 illustrates a process for activating a microphone in a system for controlling a kitchen appliance for processing food by means of a voice command.

FIG. 4 shows a process for activating the kitchen appliance in order to ready the appliance for receiving a voice command.

The kitchen machine is connected to a peripheral communication device 404 (such as that which forms part of the speech recognition unit 140), by means of, for example, a wireless technology, such as Bluetooth or Wi-Fi. Activation of the kitchen appliance 100 is triggered by the peripheral communication device 404.

For example, in a first step 400, an application located on the peripheral communication device 404 (shown in the form of a smartphone) uses a proximity sensor on the device 410, which waits until it has been covered (e.g. by a hand or other object) for a pre-determined period of time by a user. Once covered for this pre-determined period of time, in a next step 420, the device listens and records sound so as to capture a voice command. The recorded sound is then analysed and converted to text—either by the device, by other parts of the speech recognition unit 140, an external server to which the device 404 is connected via the internet (such as a cloud-based speech recognition service), or by the kitchen appliance (the recorded sound having been transmitted to the kitchen appliance).

The text is received by the kitchen appliance 430 or by other parts of the speech recognition unit 140 (for example, if processed by the smartphone, then via Bluetooth or Wi-Fi). Alternatively the text may be received by a cloud-based text recognition service and then translated into an identifier (for example a command-number or code) that is then transmitted to the kitchen appliance 430. The kitchen machine or the other parts of the speech recognition unit 140 (e.g. a cloud network entity) processes the incoming text string to see if it is a command. If a command is recognised, the command is communicated to the kitchen appliance, and specifically to the control circuitry 130 of the kitchen appliance.

As shown, an example of a command is the instruction to open the head of the kitchen appliance (where the kitchen appliance is a stand mixer, for example), in which case the kitchen appliance will, by means of its control circuitry, open the head.

Other examples of commands include: to turn the kitchen appliance on/off; to control temperature; and to control speed and heating element temperature settings.

Available commands (i.e., commands that the user may use at a given time) may be displayed to user via a visual display, with commands not available at that time (i.e., because they are associated with functionalities that cannot be carried out due to the condition of the appliance at that moment) not displayed to the user. The visual display may be one integrated with the kitchen appliance for providing feedback, or integrated with a mobile communications device in electronic communication (either wireless or wired, direct or mediated through one or more intermediaries) with the kitchen appliance 100 such as that comprising the speech recognition unit 140. Alternatively, or in addition to this, the available commands may be given to the user through auditory feedback from a speech-capable digital assistant such as Amazon Alexa™ or Google Assistant™ via a smart-speaker. The sets of commands that may be used with a given kitchen appliance 100 may be automatically downloaded from an external server onto the device in which the microphone 110 or speech recognition unit 140 is integrated, or other suitable device, for communication to the user.

The microphone 110 and/or speech recognition unit 140 (anything done by one may be done by the other) may be sensitive to sound between 20 Hz to 20 kHz (i.e., the approximate auditory range of a human being), more preferably sound between 200 Hz to 4 kHz (the approximate auditory range within most speech falls—also known as "voice frequency"), and still more preferably to sound between 400 Hz and 2.5 kHz (a frequency band sufficient to capture enough detail to recognise speech). Using more narrow frequency-band microphones is desirable as they are typically cheaper, and additionally the transmission and storage of speech captured within a narrower frequency is easier as it includes less data. Moreover narrower-bandwidth microphones will detect less in the way of extraneous sound.

In one alternative, any form of sound command can replace the voice command that is, including sound originating other than directly from a human; for example, this includes from pets, environmental sounds (e.g. front door closing), or from a speech synthesiser.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A kitchen appliance having:
   a control arrangement arranged to receive sound commands and to operate the appliance in response to the sound commands;
   a microphone arranged to receive sound comprising a sound command and to provide the sound to the control arrangement;
   a motor for driving a food processing tool;
   at least one acoustic filter configured to suppress from the sound provided to the control arrangement background noise created by operation of the motor; and
   a sensor for sensing at least one of: speed; torque; current; and direction of the motor, wherein the acoustic filter is configured to vary the suppression of background noise in dependence on the sensor output.

2. The kitchen appliance according to claim 1, wherein the acoustic filter is arranged to suppress noise created by movement of moving parts of the kitchen appliance.

3. The kitchen appliance according to claim 1, wherein the acoustic filter is configured to suppress background noise before and/or after a sound is detected by the microphone.

4. The kitchen appliance according to claim 1, further comprising:
   a processor arranged to identify an operating instruction from a sound command.

5. The kitchen appliance according to claim 1, wherein the sensor is one selected from the group comprising: optical encoders, magnetic encoders, hall-effect sensors, and current sensors arranged to detect characteristics of electrical current flowing through the motor and having processing means for calculating speed and/or torque of the motor based on the detected characteristic.

6. The kitchen appliance according to claim 1, wherein the kitchen appliance is a food processing appliance and/or a stand mixer, blender, food processor, juicer or mincer.

7. A system for controlling the kitchen appliance of claim 1.

8. The system according to claim 7, wherein the kitchen appliance is defined according to claim 1.

* * * * *